(12) United States Patent
Ferkany et al.

(10) Patent No.: US 7,096,758 B1
(45) Date of Patent: Aug. 29, 2006

(54) TOOL FOR REMOVING AUTOMOBILE GAS CAP AND FOR HOLDING GAS-FILLING NOZZLE OPEN

(75) Inventors: Michael A. Ferkany, White Lake, MI (US); Patricia Ann Ferkany, White Lake, MI (US); Amelia Ferkany, Auburn Hills, MI (US)

(73) Assignee: MPM Creations, LLC, White Lake, MI (US)

( * ) Notice: Subject to any disclaimer, the term of this patent is extended or adjusted under 35 U.S.C. 154(b) by 0 days.

(21) Appl. No.: 11/116,605

(22) Filed: Apr. 29, 2005

(51) Int. Cl.
*B67B 7/14* (2006.01)

(52) U.S. Cl. .................. 81/3.4; 81/124.2; 81/177.5; 81/119; 81/177.6

(58) Field of Classification Search ............... 81/3.4, 81/3.42, 119, 124.2, 121.1, 177.5, 177.6, 81/177.7
See application file for complete search history.

(56) References Cited

U.S. PATENT DOCUMENTS

| | | | | |
|---|---|---|---|---|
| 3,010,346 A | * | 11/1961 | Kulp | 81/124.2 |
| 3,656,793 A | * | 4/1972 | Matthews | 81/120 |
| 4,607,406 A | * | 8/1986 | Davis, Jr. | 7/100 |
| 4,836,065 A | * | 6/1989 | Setliff | 81/124.2 |
| D387,255 S | | 12/1997 | Rhoton | |
| 5,699,701 A | * | 12/1997 | Cotten, Jr. | 81/3.4 |
| 5,896,785 A | | 4/1999 | Shaw et al. | |
| 6,237,797 B1 | | 5/2001 | Hurford | |

* cited by examiner

*Primary Examiner*—Lee D. Wilson
*Assistant Examiner*—Anthony Ojini
(74) *Attorney, Agent, or Firm*—Charles W. Chandler; Steve M. Clemmons

(57) ABSTRACT

A tool for removing a gas cap from the gas-receiving tube of a vehicle.

8 Claims, 3 Drawing Sheets

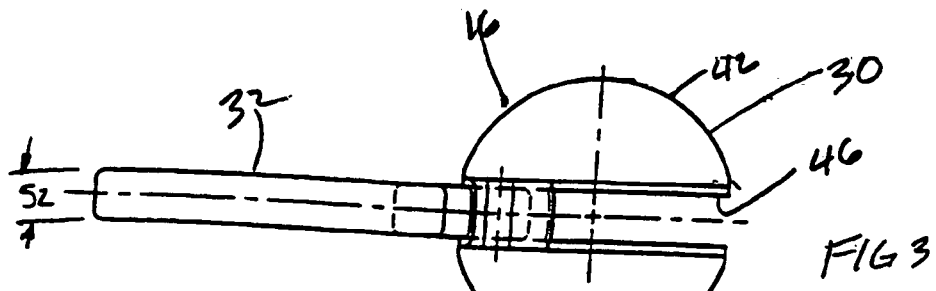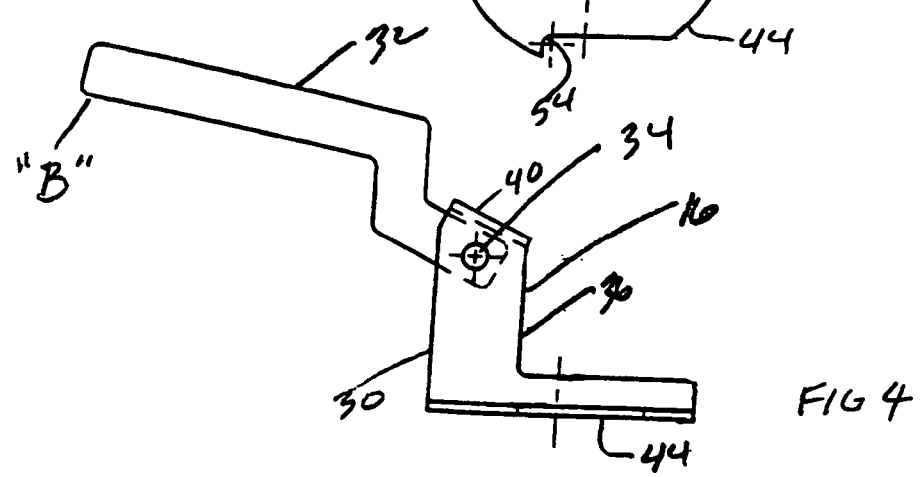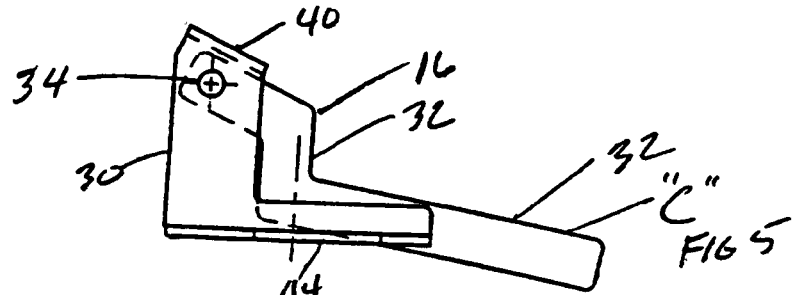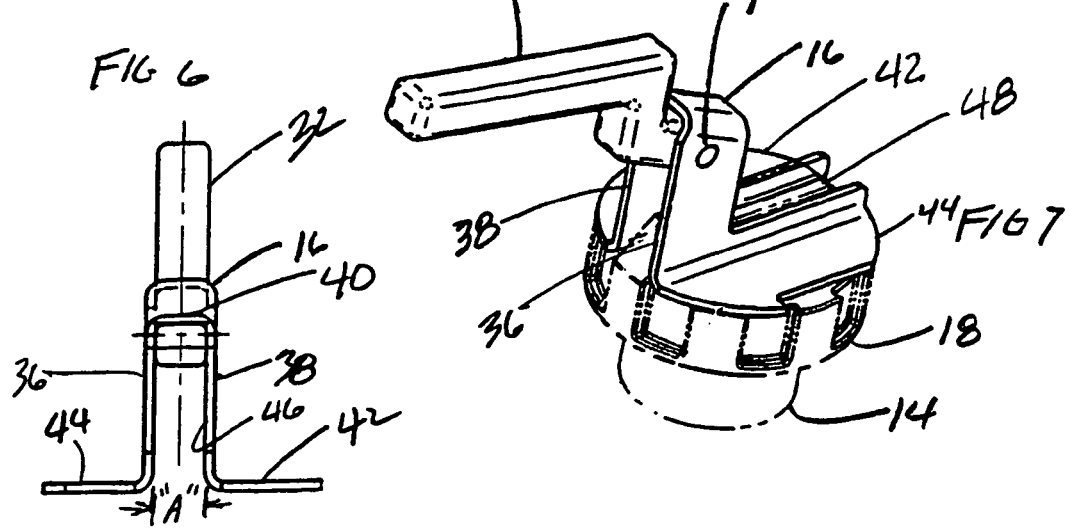

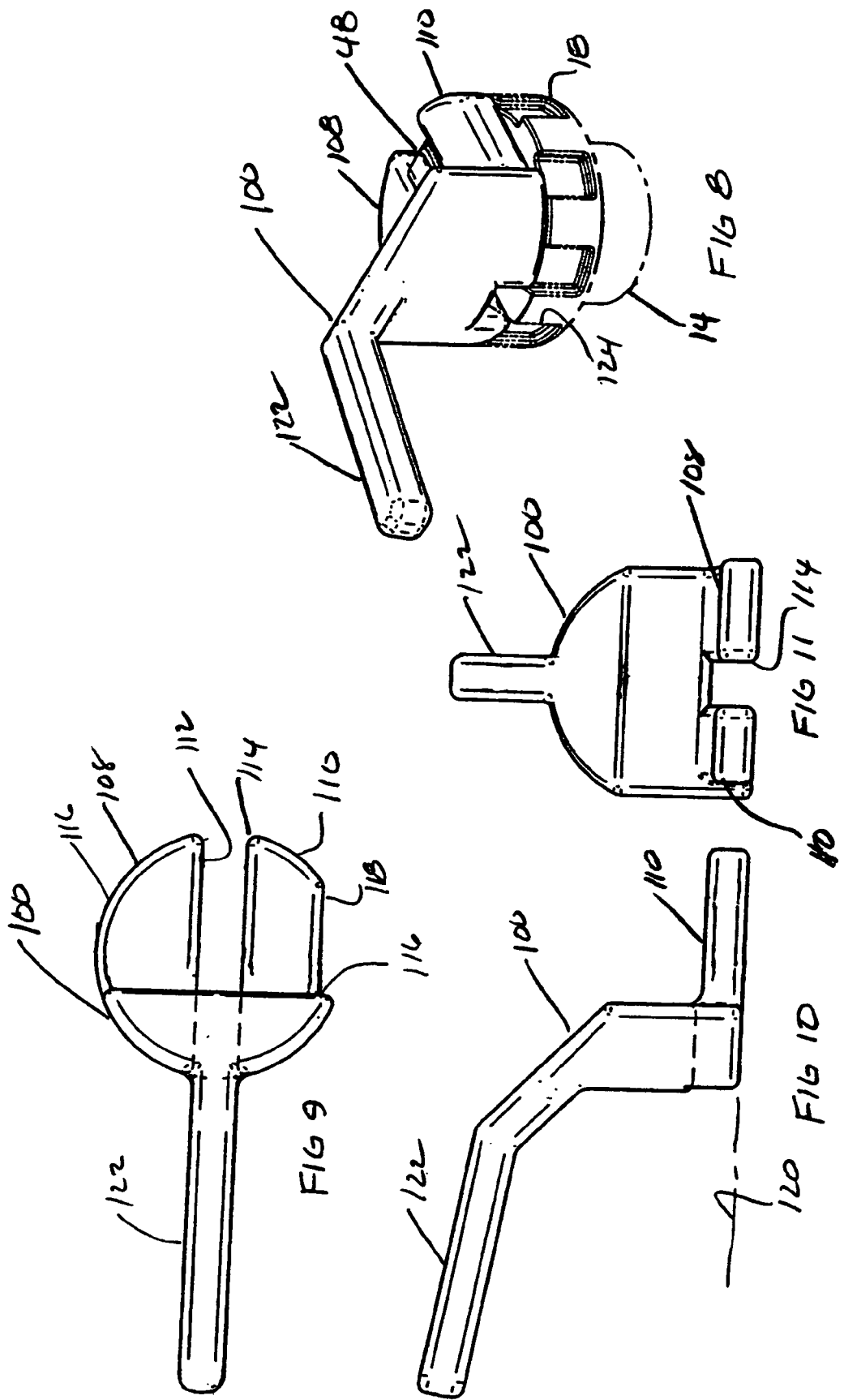

TOOL FOR REMOVING AUTOMOBILE GAS CAP AND FOR HOLDING GAS-FILLING NOZZLE OPEN

BACKGROUND AND SUMMARY OF THE INVENTION

Few gasoline service stations offer full service. Automobile operators or their passengers have to fill their own gas tanks. Proper sealing of evaporative fumes to minimize pollution has led most automotive manufacturers to design gas tank caps that include a feature that ensures proper tightening of the cap. The user must rotate the gas cap until it emits an audible click. Furthermore, the gas cap is generally recessed behind an access panel door that opens on the rear panel or one of the rear quarter panels of the vehicle to help prevent loss of the gas cap. For anyone with weak wrists or forearms, removing and properly retightening the gas cap with these restrictions can be very difficult.

In addition, gas-filling nozzles on most self service pumps include an automatic safety shut-off feature that stops the delivery of fuel when the tank is full, and a feature (auto fill), which allows the filling nozzle trigger to be set at several different delivery rates without the user continuously holding onto the trigger. Often the auto fill detents or setting plates on the filling nozzle are broken or missing thus requiring the consumer to manually hold the trigger until the tank is full.

Many vehicles have a tether that connects the gas cap to the access door. One end of the tether is attached to the gas cap tang, usually in a location along the top edge of the tang.

Prior art patents that have recognized these problems include U.S. Pat. No. 6,237,797 issued May 29, 2001 to John J. Hurford for "Fuel Cap Extension"; U.S. Pat. No. 5,896,785 issued Apr. 27, 1999 to Richard J Shaw et al. for "Automobile Gas Cap Removal Tool"; U.S. Pat. No. 5,699,701 issued Dec. 23, 1997 to David L. Cotten, Jr. for "Tool For Removing Vehicle Gas Tank Cap"; Des. 387,255 issued Dec. 9, 1997 to Ray G. Rhoton for "Combined Gas Cap Removal and Tightening Device". These prior art tools cannot be mounted on a gas cap tang having a tether. The tether prevents these tools from receiving the tang.

The preferred tool of this invention comprises either a single body or a multiple-part assembly composed of plastic compounds for fitting over the male tang on an automotive gas cap to assist in removing and retightening the gas cap, and for holding a gas-filling nozzle trigger open at various delivery rates.

The preferred tool has an extension handle outside of the recessed access panel area of the gas cap to give the user access for turning the tool. Further, the tool provides the user a handle spaced from the gas cap turning axis for producing greater leverage.

The multiple-part tool is foldable to minimize the space required to store the tool.

The preferred embodiment is a one-piece plastic tool. Another embodiment is a two-piece tool. Both tools can either engage the tang, or straddle the access door.

The preferred tool easily loosens and tightens gas caps that require a double click for tightening. The tool fits over or under the gas cap tether, regardless of the caps original position. To remove the gas cap, place the gas cap tang in the tool opening and turn counter-clockwise. To tighten the gas cap, first turn the cap clockwise by hand until it starts to resist. Then, turn the tool clockwise until you hear two or more clicks. Keep turning to a convenient spot for loosening the gas cap next time. If not needed while filling, store the tool on the access panel door.

The preferred tool can be used to hold the fill nozzle open whenever you find a broken nozzle detent mechanism. Simply insert the fill nozzle into the gas filler neck, squeeze the trigger to start the flow of gasoline, and then insert the flat portion of the tool between the trigger and the flat in the bottom portion of the nozzle handle.

The tool of this invention, composed of plastic compounds, provides a channel and openings that allow the tool to be safely stowed on the gas cap access panel door of the vehicle without damaging the vehicle finish.

The tool of this invention provides a ledge and a perpendicular stop in combination with an opposed cam surface that allows the tool to be inserted in the gas-filling nozzle assembly at various angles to hold the gas-filling nozzle trigger at different rates of delivery, thus allowing automatic filling of the vehicle without manually holding the gas-filling nozzle trigger.

Still further objects and advantages will become apparent to those skilled in the art to which the invention pertains.

DESCRIPTION OF THE DRAWINGS

The description refers to the accompanying drawings in which like reference characters refer to like parts throughout the several views, and in which:

FIG. 3 is a plan view of an illustrative multiple part tool;

FIG. 4 is a view of a side view of the tool of FIG. 3 with the handle in an open position;

FIG. 5 illustrates the tool handle disposed in a collapsed position;

FIG. 6 is a view as seen from the right side of FIG. 4;

FIG. 7 illustrates the multiple part tool mounted on the gas tank tang;

FIG. 8 shows a preferred one-piece tool mounted on a gas cap; and

FIG. 9 is a plan view of the one-piece tool;

FIG. 10 is an elevational view of the one-piece tool; and

FIG. 11 is a view of the tool as seen from the right side of FIG. 10.

DESCRIPTION OF THE PREFERRED EMBODIMENT

Figure 1:
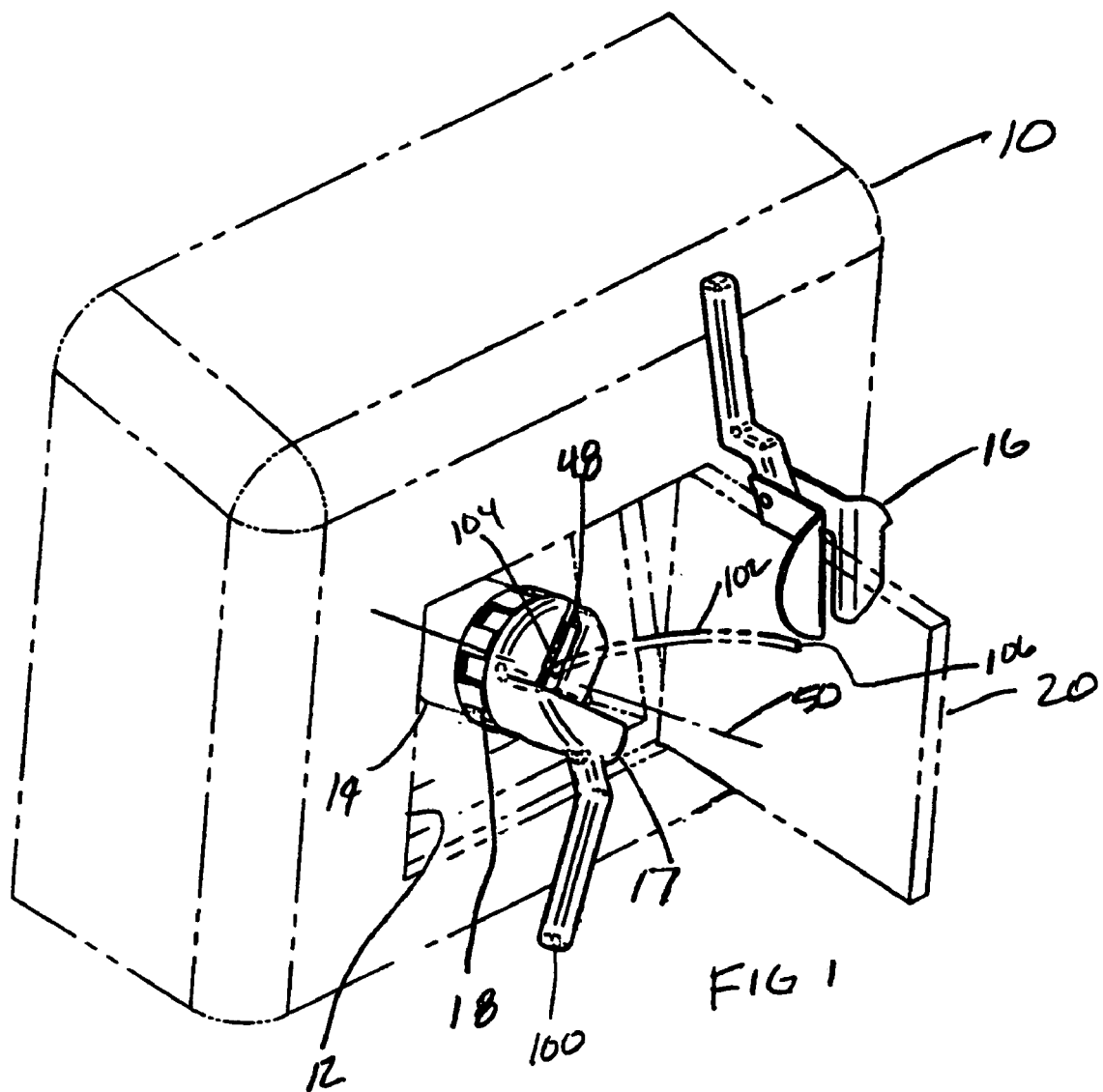
FIG. 1 illustrates a vehicle gas-filling tube with a one-piece tool mounted on the gas cap tang, a multiple-part embodiment is mounted on the access door.

Referring to the drawings, FIG. 1 illustrates a section of a vehicle 10 having a gas-filling tube well 12 for enclosing the upper end of a gas-filling tube 14. A multiple part tool 16 illustrating one embodiment of the invention is mounted on an access door 20 which closes well 12. A preferred one-piece tool 17 is illustrated mounted on a gas tank cap 18.

Figure 2:
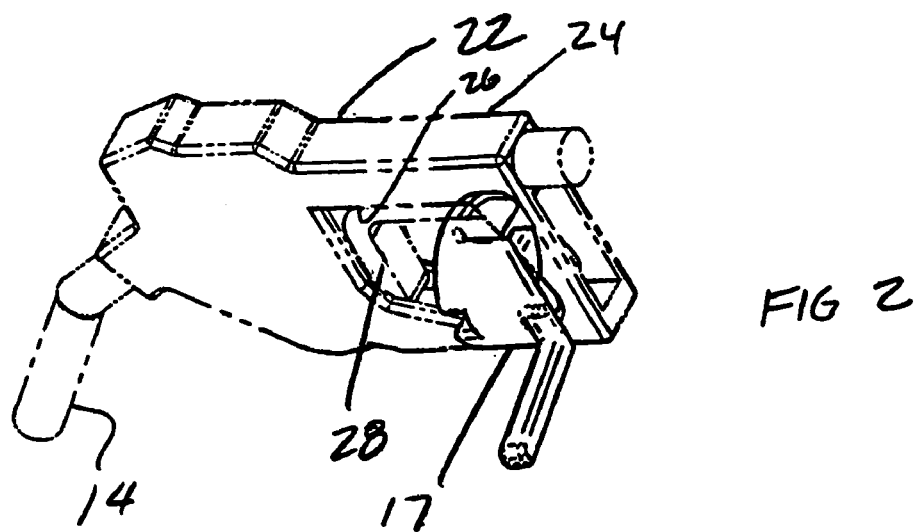
FIG. 2 shows the one-piece tool wedged in the handle opening of a conventional gas nozzle to retain the trigger in a position for delivering gas.

FIG. 2 illustrates a conventional gas-filling nozzle 22. The nozzle has a handle 24 having an opening 26. A trigger 28 is pivotally mounted in the opening. Tool 17 is employed for wedging the trigger to deliver gas to the filling tube.

Referring to FIGS. 3–7, tool 16 has a body 30, a handle 32 and a pivot member 34.

The body is a one-piece member, preferably formed of plastic, and having a U-shaped configuration with a pair of sheet-like parallel arms 36 and 38 joined to a bight 40. The lower ends of the arms merge into a pair of plate-like coplanar wings 42 and 44. Arms 36 and 38 are spaced a distance "A" to form an opening 46 between the two arms. Opening 46 extends continuously from the bottom edges of the arms, to bight 40. The sides of opening 46 are spaced a distance slightly greater than the width of gas cap tang 48, to receive the tang for a turning motion.

The tang forms a tongue along the outer edge of the cap to permit a user to manually turn the cap about a turning axis 50, shown in FIG. 1, for either removing or mounting the cap on the filling tube. The thickness of the tang is approximately the same as the thickness of panel 20 so that tool 16 can be mounted either on the tang as illustrated in FIG. 7, or mounted on the access door as illustrated in FIG. 1.

One end of handle 32 is pivotally mounted on pivot member 34, between arms 36 and 38. The handle is elongated and pivotal between an open position at "B", as shown in FIG. 4, or a collapsed position as shown in FIG. 5 at "C". In the open position the handle can be swung to a position generally perpendicular to the turning axis of the cap.

The handle has a thickness 52 as shown in FIG. 3. Thickness 52 is slightly less than width "A" of opening 46 so that the handle can be swung from the open position, to a collapsed position, in which the handle is received in opening 46.

Wings 42 and 44 are in a plane perpendicular to arms 36 and 38, and collectively form peripheral edges that can be wedged in the gas nozzle handle between the trigger and the lower side of the nozzle opening. Notch 54 provides a means for positioning the tool as it is inserted in its wedged position. The particular wedged position depends upon the desired trigger position.

In use, the tool body can be mounted on tang 48 for either removing or mounting the gas cap on tube 14. The handle is then disposed in a position perpendicular to the turning axis of the cap, outside of well 12, to provide a favorable leverage for turning the cap.

A preferred one-piece tool 100 is illustrated in FIGS. 1 and 8 mounted on gas tank cap 18. A tether 102 has one end attached at 104 to the outer edge of the gas tank cap and its opposite end connected at 106 to the access door 20. The tether prevents the gas tank cap from dropping to the ground as the tank is being filled.

Tool 100 is preferably formed of a suitable plastic material and has a pair of co-planar wings 108 and 110 spaced to provide an opening 112 and end opening 114. End opening 114 is dimensioned to straddle the tang of the gas tank cap. Opening 112 is dimensioned for receiving the tang, or for being mounted on the edge of the access door. The outer edges 116 and 118 of the wings are dimensioned to be wedged in a gas-filling nozzle for retaining the trigger in an open position. Wing 110 has a notch 116 to assist in locating the tool as it is being inserted in its wedged position.

The two wings have a lower surface disposed in a plane 120 which abuts the upper surface of the gas tank cap. The tool has a handle 122 that is spaced from plane 120 a suitable distance such that the wings may be disposed inside the fill tube well while handle 122 is disposed outside the well to permit the user to turn the tool about the turning axis of the gas tank cap.

In use, the tool wings straddle the gas cap tang in a position in which a channel 124 forms an extension of opening 112, as shown in FIG. 8. The upper open side of the wings permits the tang to be received in opening 112 such that the user can turn the tool without interference from the tether.

Having described our invention, we claim:

1. A tool for turning a vehicle gas tank cap having a tang, comprising:

a body having a pair of spaced arms defining a tang-receiving opening dimensioned to receive a tang of a gas cap for turning the tang about a turning axis, and for straddling a vehicle-mounted access door employed for closing access to a gas-filling tube; and a handle pivotally mounted on the body for pivotal motion between an open position in which the handle is perpendicular to the turning axis of the cap for rotating the cap about said axis, and a collapsed position in which the handle is disposed in the tang-receiving opening.

2. A tool as defined in claim 1, in which the body has a pair of co-planar wings dimensioned to be received in the opening of a gas-filling nozzle handle having a trigger for permitting gas to flow through the nozzle, such that outer edges of the co-planar wings wedge the trigger in an open gas-delivering position.

3. A tool as defined in claim 1, and including:

a pivot member mounted on the arms; and a handle having one end pivotally mounted on the pivot member, the handle having a thickness less than the distance between the arms whereby the handle can be swung from an open position perpendicular to the turning axis of the gas tank cap to a collapsed position between the arms.

4. A tool as defined in claim 1, in which the body has a U-shaped configuration including a pair of parallel sides and wings integrally connected to outer ends of said pair of sides and extending in opposite directions away from the arms in a co-planar position, said wings cooperatively define a flat bottom-most surface of said body.

5. A one-piece tool for removing a vehicle gas tank cap having a tang, said tool is formed from a single contiguous piece, the piece being shaped into the tool comprising:

a body having a pair of spaced integral arms defining an opening dimensioned to receive a tang of a gas cap for turning the gas cap about a turning axis; and a handle which extends away from said body in a fixed position;

the arms having a tang-receiving opening for receiving the tang to a turning position between the arms in which a tether attached to the tang is received between the arms.

6. A tool as defined in claim 5, in which the body has a pair of wings attached to the arms, having a combined diameter dimensioned to be received in the opening of a gas nozzle handle to wedge a trigger in the opening in an open gas-delivering position.

7. A tool for removing a vehicle gas tank cap having a tang, comprising:

a body having a pair of spaced arms defining a tang-receiving opening for straddling a tang of a gas cap mounted on a gas-filling tube and for straddling a vehicle-mounted door employed for closing access to the filling tube; and a handle pivotally attached to the body for turning the gas cap between an open position in which the handle is perpendicular to the turning axis of the cap for rotating the cap about said axis and a collapsed position in which the handle is disposed in the tang-receiving slot.

8. A tool for turning a vehicle gas cap having a tang, comprising:
- a handle;
- a body which is coupled to one end of the handle at the top of the body; and
- a pair of spaced parallel arms which are coupled to the bottom of the body along a top surface of the arms at a first end of the arms, the arms are generally flat and cooperate to define a tang-receiving opening which extends the length of the arms, wherein the top surface of the arms remains unobstructed at the ends of the arms opposite to the first ends.

* * * * *